United States Patent [19]

Chawla et al.

[11] 4,131,015
[45] Dec. 26, 1978

[54] DEVICE FOR MEASURING MASS FLOW

[75] Inventors: Jogindar M. Chawla, Durmersheim; Peter von Böckh, Karlsruhe; Manfred Dörnemann, Düsseldorf, all of Fed. Rep. of Germany

[73] Assignee: Agefko Kohlensäure-Industrie GmbH, Düsseldorf, Fed. Rep. of Germany

[21] Appl. No.: 828,255

[22] Filed: Aug. 25, 1977

[51] Int. Cl.² .............................................. G01F 1/28
[52] U.S. Cl. .................... 73/199; 73/205 D; 73/228; 62/49
[58] Field of Search ............ 73/199, 205 R, 205 D, 73/211, 213; 62/49; 364/510, 557, 558, 851

[56] References Cited

U.S. PATENT DOCUMENTS

| | | | |
|---|---|---|---|
| 2,022,695 | 12/1935 | Stuart | 62/49 |
| 2,284,013 | 5/1942 | Pardoe | 73/213 |
| 2,291,678 | 8/1942 | Benz et al. | 62/49 |
| 2,402,355 | 6/1946 | Whaley, Jr. | 73/199 X |
| 2,954,692 | 10/1960 | Hornfeck | 73/205 |
| 3,173,003 | 3/1965 | Moller-Girard | 73/205 X |
| 3,247,713 | 4/1966 | Reed | 73/199 |
| 3,691,838 | 8/1972 | Kalotay | 364/510 X |
| 4,000,603 | 2/1977 | Golahny | 73/194 M |

FOREIGN PATENT DOCUMENTS 2313099  9/1974  Fed. Rep. of Germany ............ 73/211

*Primary Examiner*—Herbert Goldstein
*Attorney, Agent, or Firm*—Spencer & Kaye

[57] ABSTRACT

Measuring the mass flow of a liquid gas pumped from a storage tank to a consumer through a measuring station, includes the steps of throttling the flow of the liquid gas by a throttle in the measuring station; measuring the flow of the liquid gas according to the relationship $$\dot{M} = C\left(\frac{\Delta p}{1/\rho}\right)^m$$

wherein $\dot{M}$ is the flow rate, C and m are instrument constants evaluated by calibration, $\Delta p$ is the head difference and $\rho$ is the liquid density; maintaining the delivery pressure of the liquid gas higher than its vapor pressure plus the maximum momentary head difference at the throttle; and compensating for the temperature-caused liquid density variation, including the steps of measuring the temperature of the liquid gas by a semiconductor having a resistance/temperature curve and adapting the curve to the density/temperature curve of the liquid gas.

9 Claims, 5 Drawing Figures

DEVICE FOR MEASURING MASS FLOW

BACKGROUND OF THE INVENTION

This invention relates to a device for measuring the mass flow of liquid gas which is pumped in a transfer conduit from a first storage vessel (such as a tank car) through a measuring station to a consumer such as a second storage vessel or the like. At least the transfer conduit portion up to and including the measuring station is cooled prior to measurement, by circulating the liquid gas through the measuring station and a bypass conduit which is arranged downstream of the measuring station and which leads back to the first storage vessel. The temperature to which the conduit portion is cooled is below the boiling temperature of the liquid gas. Upon reaching this desired low temperature, the bypass conduit is shut off, the conduit leading to the consumer is opened and the flow metering starts.

The handling of liquid gases is rendered difficult basically by the fact that at ambient temperature they generate a vapor pressure which lies significantly above the atmospheric pressure and thus these liquid gases tend to pass into the vapor phase. Therefore, they must be maintained at very low temperatures, such as $-30°$ C in case of carbon dioxide and $-180°$ C in case of nitrogen.

From the commercial point of view the most significant type of measuring is the quantity measurement during the course of filling various stationary consumer storage vessels from tank cars. Conventionally, the pumped liquid gas quantity is determined by weighing the consumer vessel before and after the filling operation. This measuring method, however, involves substantial expense, because for each consumer vessel a separate scale has to be made available and the scales have to be calibrated at predetermined periods.

For these reasons more recently measuring processes have been developed which operate on the earlier-described principle and wherein the measuring station contains a propeller (impeller) counter or a turbine counter for effecting continuous flow rate measuring. These counters, however, must not be exposed to the liquid gas flow at the beginning of the pumping operation, because the liquid gas is, in a large measure, in the vapor phase due to the still warm connecting conduits, resulting in significantly higher flow velocities. Consequently, the counters designed for the liquid flow measurement would be overdriven. In order to prevent such an occurrence, it is known to bypass the counter during the pump start operation and by first circulating the liquid gas in a closed circuit for the purpose of cooling the conduits and particularly the measuring station to such an extent that no vapor generation can take place. Only then is the liquid gas caused to flow to the consumer through the measuring station.

A significant difficulty encountered in a system operating as outlined above is the low temperature-caused high degree of bearing wear at the propeller shaft or turbine shaft. Consequently, particularly expensive bearing metals have to be used. When liquid nitrogen is handled, however, even the use of such bearing metals has not led to a satisfactory operational safety or life expectancy.

SUMMARY OF THE INVENTION

It is an object of the invention to provide an improved liquid gas measuring device with which measurements may be performed under operationally safe conditions even in case of particularly low-temperature liquids such as liquid air or liquid nitrogen. It is a further object to ensure that the measuring process performed according to the invention excels by its high accuracy and can be practiced with an apparatus of low-expense construction.

These objects and others to become apparent as the specification progresses, are accomplished by the invention, according to which, briefly stated, the measuring of the mass flow of a liquid gas pumped from a storage tank to a consumer through a measuring station, includes the steps of throttling the flow of the liquid gas by a throttle in the measuring station; measuring the flow of the liquid gas according to the relationship $$\dot{M} = C \left( \frac{\Delta p}{1/\rho} \right)^m$$

wherein $\dot{M}$ is the flow rate, C and m are instrument constants evaluated by calibration, $\Delta p$ is the head difference and $\rho$ is the liquid density; maintaining the delivery pressure of the liquid gas higher than its vapor pressure plus the maximum momentary head difference at the throttle; and compensating for the temperature-caused liquid density variation, including the steps of measuring the temperature of the liquid gas by a semiconductor having a resistance/temperature curve and adapting the curve to the density/temperature curve of the liquid gas.

The invention is based on the recognition that the mass flow in case of mixed phases of liquid and vapor can be determined by the known principle of measuring the differential pressure (pressure head) at throttle points, provided that care is taken by means of a sufficient pressure increase in the flow that no vapor phase is present and that the pressure drop occurring momentarily at the throttle does not lead to local vaporization either. The invention is based further on the recognition that for obtaining a high precision measurement, it is indispensable to take into a account the density change of the liquid as a function of the temperature. By using, for this purpose, a semiconductor whose resistance characteristics are directly proportionate to the density or to a magnitude derived therefrom (such as, for example, its reciprocal value), a particularly economical measurement can be achieved.

An advantage of the invention resides further in the fact that no moving components whatever are required at the measuring station. Consequently, problems based on the property of materials particularly those of bearings for rotary elements do not occur. At the same time, the precision of measurement and the operational safety of such a measuring process involving only stationary components are higher than in processes known heretofore.

In accordance with a particularly advantageous structural feature of the invention, the throttle (constriction in the flow passage) is formed by a piston which projects transversely into the liquid flow and terminates in a spherical head. In this manner the throttle device is void of any sharp edges to which vapor bubbles would adhere during the pumping and would thus lead to cavitation. Thus, the geometry of the piston remains true even during extended operation. Further, the piston structured according to the invention constitutes a good compromise between the conventional orifice plates which effect only an accelerational pressure loss and nozzles whic also cause appreciable frictional pressure losses. The radius of the spherical piston head and thus the radius of the piston is expediently the same as the inner radius of the tube which defines a flow passage for the liquid gas and in which the piston is disposed.

For measuring the head difference, the tube is provided with two transverse bores. It is advantageous to arrange the first transverse bore in the narrowest flow passage section of the throttle and further, to arrange the second transverse bore upstream of the first bore at a distance which at least is as large as the inner diameter of the tube. In this manner the course of the flow coefficient $\alpha$ can be represented as a linear function of Reynolds's number and thus the mass flow rate $\dot{M}$. In this manner the evaluating process is simplified and further, related to the calculating input, an increased precision of measuring is achieved. Selection of the distance between the transverse bores 14 and 15 and of the radius of the spherical terminus of the piston 12 according to the aforementioned values is for optimizing measurement conditions.

The temperature measurement for taking into account the varying liquid density is carried out advantageously by arranging the temperature sensor in the throttle piston. Advantageously, the temperature sensor is a semiconductor, such as a pyroelectric conductor. In order to correlate the measured temperature values with the liquid densities without substantial calculating steps, it has been found particularly expedient to connect a first potentiometer in parallel with the temperature sensing semiconductor and to connect a second potentiometer in series therewith. It is the function of the parallel-connected potentiometer to adapt the curve slope of the semiconductor to that of the density/temperature curve, whereas the serially-connected potentiomer compensates for the possible ordinate difference between the semiconductor curve and the density curve. It is to be understood that, as a reference value, it is feasible to utilize, instead of the direct density values, a magnitude which has a linear relationship therewith, such as the reciprocal value.

In accordance with a further advantageous feature of the invention, the measuring station contains a pressure-responsive switch with timing relay and downstream of the measuring station there is arranged a flow resistance. The pressure-responsive switch, when a predetermined minimum pressure at the measuring station is exceeded and a safety period has lapsed, causes opening of the conduit to the consumer. In this manner it is automatically ensured that the liquid which passes through the measuring station is exclusively in its liquid phase.

DESCRIPTION OF THE PREFERRED EMBODIMENT

Figure 2:
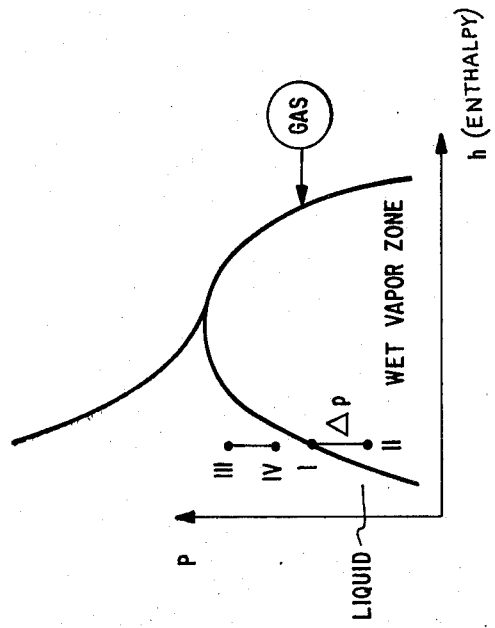
FIG. 2 is a phase diagram in the two-phase zone.
Figure 1:
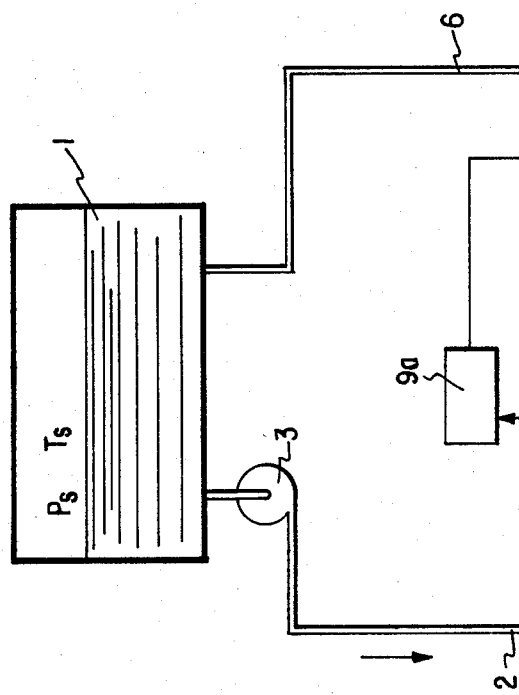
FIG. 1 is a schematic diagram illustrating a preferred embodiment of the invention.

Turning now to FIGS. 1 and 2, a storage tank 1 contains liquid gas in the saturated phase, that is, its pressure ($P_s$) and temperature ($T_s$) values are on the boundary curve illustrated in FIG. 2. An outlet conduit 2 extends from the storage tank 1 and leads through a pump 3, to a measuring station generally indicated at 4. Downstream of the measuring station, as viewed in the direction of liquid flow, there is arranged a three-way valve 5 which directs the liquid gas either through a bypass conduit 6 back to the storage tank 1 or through a conduit 7 into a consumer storage vessel 8. The three-way valve 5 is controlled by means of a pressure-responsive switch 9 and a timing relay 9a.

The measuring station 4 comprises a cylindrical tube 4a, at the inlet of which there is arranged a flow rectifier 10 to ensure flow homogenization. At the outlet end of the tube 4a there is arranged a flow resistance 11. Between the flow rectifier 10 and the flow resistance 11 there is arranged a piston 12 in a certain radical position with respect to the tube 4a and which has a spherical terminus forming a throttle together with the oppositely-lying wall portion of the tube 4a. The inside of the piston 12 accommodates a temperature sensor formed as a pyroelectric conductor 13.

The tube 4a is provided with two axially spaced transverse bores 14 and 15 coupled by a conduit to a pressure difference sensor 16 which generates a signal as a function of the head difference. The transverse bore 15 is situated at the narrowest flow passage cross section (throttle) of the tube 4a. The transverse bore 14 is located upstream of the transverse bore 15 at a distance therefrom which generally corresponds to the inner diameter of the tube 4a.

The above-described system operates as follows:

As soon as the conduit 7 is attached to the consumer vessel 8, the conduit 2 is opened by a valve, not shown. At the same time, the three-way valve 5, controlled by the pressure-responsive switch 9, maintains the conduit 7 closed, while simultaneously it maintains the bypass conduit 6 open. The liquid gas first expands in the conduit system and is first circulated by the pump 3 in its gas phase. By means of the liquid circulation in a closed circuit, the conduit system is gradually cooled, so that the proportion of the liquid phase increases and the delivery pressure of the pump 3 rises. This pressure increase is enhanced by a flow resistance 17 located downstream of the measuring station 4.

If the conduit pressure has increased by a predetermined magnitude beyond the saturation pressure in the storage tank 1, the pressure-responsive switch 9 responds and actuates the timing relay 9a. After an approximately one-minute delay, the timing relay 9a unlocks the three-way valve 5, so that thereafter, when required, the vlave 5 may be switched and the consumer vessel 8 may be filled. Simultaneously with the switching of the valve 5 the flow counter is started.

The time relay 9a ensures that the temperature sensor 13 provided for the density correction reaches its operational state by the time the measuring operation is started.

Turning now in particular to FIG. 2, there are shown the pressure and enthalpy changes occurring during pumping and measuring. The phase point I lying on the boundary curve represents the values prevailing in the storage tank 1. In order to prevent a phase change into the vapor phase (for example, to phase point II) by virtue of the head difference Δp at the throttle, the liquid gas has to be compressed by the pump 3 to a higher pressure, for example, to a pressure corresponding to the phase point III. The expansion at the throttle in the tube 4a then results in a phase point IV which is situated above the boundary curve, that is, in the liquid phase.

Figure 3:
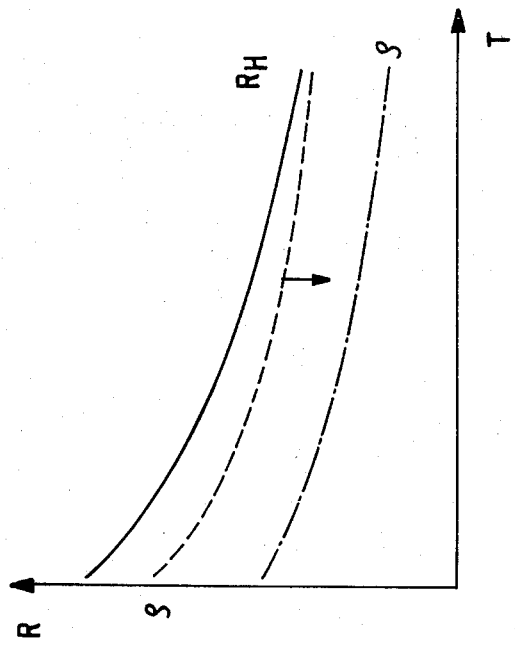
FIG. 3 is a circuit diagram of a semiconductor for the temperature measurement forming part of the invention.
Figure 4:
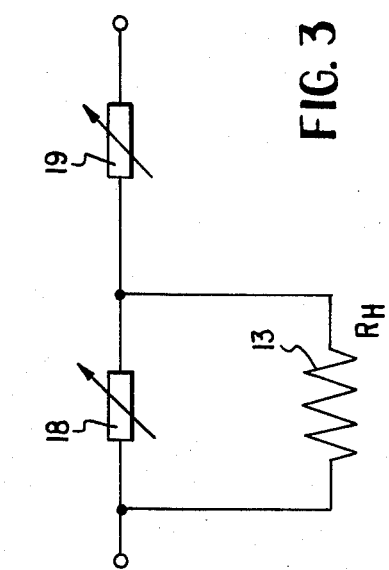
FIG. 4 is a diagram illustrating the course of the ohmic resistance and the reciprocal values of density as a function of temperature.

Turning now to FIG. 3, there is illustrated a circuit of the temperature sensor 13 constituted, for example, by a pyroelectric conductor $R_H$. The temperature sensor 13 is connected in parallel with a potentiometer 18 and in series with a potentiometer 19. Considering the pyroelectric conductor 13 alone, its ohmic resistance is a function of the temperature as shown by the solid line curve in FIG. 4. By an appropriate setting of the parallel-connected potentiometer 18, the slope of the resulting resistance of the parallel-connected potentiometer 18 and the pyroelectric conductor 13 may be altered so that the same slope is set as for the density ρ, corresponding to the dash-dotted curve shown in FIG. 4. In order to achieve a coincidence of both curves, all that is still needed is an ordinate shift which, in turn, is effected with the aid of the serially-connected potentiometer 19. The total resistance composed of both potentiometers and the pyroelectric conductor then will exhibit exactly the same temperature dependence as the density or will be proportionate to the density.

Figure 5:
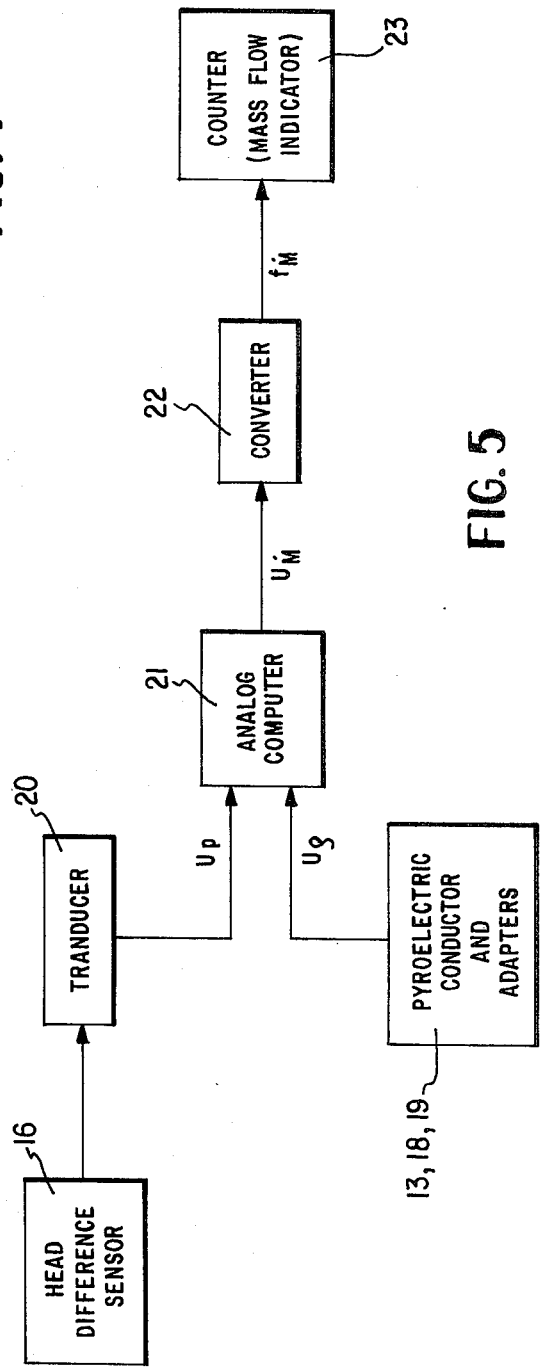
FIG. 5 is a circuit block diagram of components effecting the flow measuring according to the invention.

Turning now to FIG. 5, the automatic evaluation of the measuring values is effected in the following manner: the signal generated by the head difference sensor 16 is transformed, by a transducer 20, into a voltage $U_p$ which is proportionate to the head difference Δp. The pyroelectric conductor, in conjunction with its two adapter potentiometers, generates a voltage $U_\rho$ which is proportionate to the specific volume 1/ρ. Both voltages are applied to an analog computer (for example model CZL manufactured by Agefko Gmbh, Düsseldorf Federal Republic of Germany) which generates an output voltage $U_{\dot{M}}$ according to the equation $$\dot{M} = C(\frac{\Delta p}{1/\rho})^m$$

wherein C and m are instrument constants evaluated by calibration. The output voltage $U_{\dot{M}}$ which is proportionate to the mass flow rate $\dot{M}$, is transformed into a frequency $f_{\dot{M}}$ by means of a voltage/frequency converter 22. The resulting frequency is counted by means of an electromechanical counter 23 so that the counter indicates the mass flow, for example, in kg.

A power failure or a premature shut-off or drawing of the vapor or the gas by the pump results in a switching of the three-way valve 5, so that the counter stops. Only when the timing relay has again unlocked the three-way valve 5 can the filling of the consumer vessel 8 resume.

In summary, it is an advantage of the invention that with simple and inexpensive components a highly accurate method is provided for the flow rate measurement of liquid gases even at the lowest temperatures.

It will be understood that the above description of the present invention is susceptible to various modifications, changes and adaptations and the same are intended to be comprehended within the meaning and range of equivalents of the appended claims.

What is claimed is:

1. A device for measuring the mass flow of a liquid gas comprising in combination;
    (a) a tube having a flow inlet and a flow outlet and defining a flow passage for the liquid gas;
    (b) a throttle piston projecting transversely into the flow passage and having a spherical terminus defining, with an oppositely lying inner wall portion of said tube, a throttled part of said flow passage;
    (c) head difference measuring means for generating a first signal as a function of the difference of the pressure head at said throttled part and upstream thereof;
    (d) a temperature-dependent semiconductor exposed to the temperature of the liquid gas flowing through said tube; and
    (e) adapter means connected to said semiconductor for adapting the resistance/temperature curve of said semiconductor to the density/temperature curve of the liquid gas for generating a second signal which is a measure of the temperature-dependent density variations of the liquid gas; said adapter means comprising a first potentiometer connected in parallel with said semiconductor and a second potentiometer connected in series with said semiconductor.

2. A device as defined in claim 1, further including means receiving said first signal generated by said head difference measuring means and said second signal generated by said adapting means for generating a third signal as a function of the mass flow rate.

3. A device as defined in claim 2, wherein said third signal is a voltage signal; further comprising a converter receiving said voltage signal and transforming said voltage signal into frequency signals; and a counter connected to said converter for counting said frequency signals.

4. A device as defined in claim 1, wherein the radius of said spherical terminus is at least approximately equal to the inner radius of said tube.

5. A device as defined in claim 1, wherein said head difference measuring means comprises means defining a first transverse bore provided in said tube at the narrowest flow passage cross section of said throttled part and means defining a second transverse bore provided in said tube upstream of said first transverse bore at a distance therefrom, said distance being at least as large as the inner diameter of said tube.

6. A device as defined in claim 1, wherein said temperature-dependent semiconductor is disposed within said piston.

7. A device as defined in claim 1, wherein said temperature-dependent semiconductor is a pyroelectric conductor.

8. A device as defined in claim 1, further comprising a transfer conduit having a first conduit portion connecting said inlet of said tube with a liquid gas supply means and a second conduit portion connecting said outlet of said tube with a consumer; a bypass return conduit connecting said second conduit portion with said liquid gas supply means; valve means in said bypass return conduit and said second conduit portion; said valve mans having a first position in which it maintains communication between said outlet of said tube and said bypass return conduit and simultaneously blocks communication between said outlet of said tube and said consumer; said valve means having a second position in which it maintains communication between said outlet of said tube and said consumer and simultaneously blocks communication between said outlet of said tube and said bypass return conduit; a flow resistance disposed in said second conduit portion between said tube and said bypass return conduit; and a pressure-reponsive switch sensing the pressure of the liquid gas at a location upstream of said piston and being operatively connected to said valve means for switching said valve means from its said first position to its said second position after said pressure-responsive switch is actuated by a predetermined pressure.

9. A device as defined in claim 8, further comprising a time delay relay connected to said switch and said valve means for switching said valve means from its said first position to its said second position after a predetermined delay following actuation of said switch.

* * * * *